Feb. 6, 1968   R. PETERMANN   3,367,023
MANUFACTURING OF A POROUS METALLIC ELECTRODE
Filed May 24, 1965   2 Sheets-Sheet 1
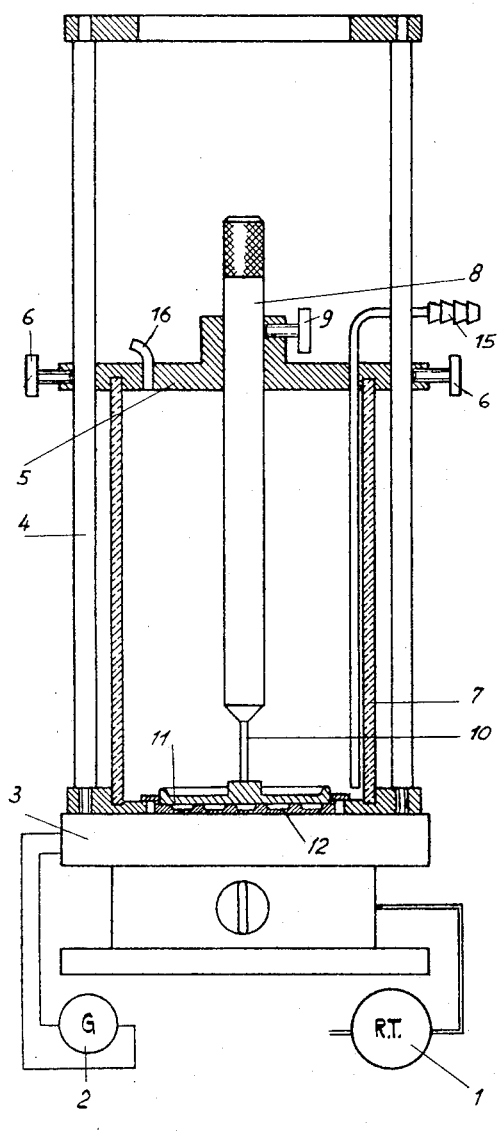
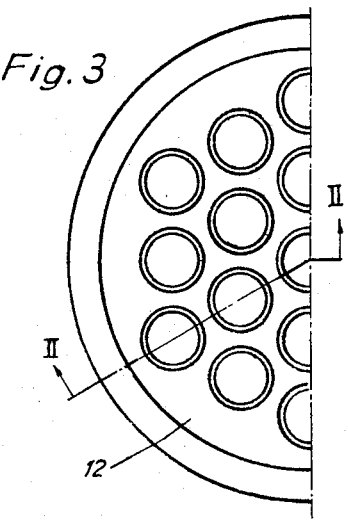
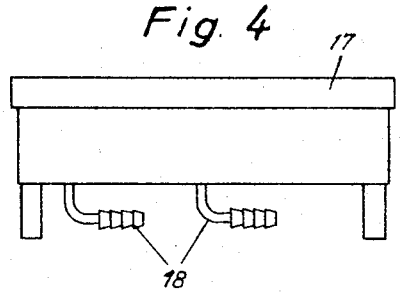

United States Patent Office 3,367,023
Patented Feb. 6, 1968

3,367,023
MANUFACTURING OF A POROUS METALLIC ELECTRODE
Robert Petermann, Zurich, Switzerland, assignor to Gesellschaft zur Forderung der Forschung an der Eidgenossischen Technischen Hochschule, Zurich, Switzerland
Filed May 24, 1965, Ser. No. 458,187
Claims priority, application Switzerland, May 26, 1964, 6,930/64
11 Claims. (Cl. 29—527)

ABSTRACT OF THE DISCLOSURE

A porous metallic electrode is formed by alloying an electrode-forming metal with a second metal which boils or sublimes at a lower temperature than does the electrode-forming metal, melting the alloy, casting a homogeneous melt from the alloy into a mold having the shape of the desired electrode, solidifying the melt in the mold, and removing the second metal from the cast electrode by evaporation thereof. The melt is cooled in the mold, by cooling one side of the mold, at a rate sufficient to cause segregation of the alloy components into a first continuous network of the high boiling point metal and a second continuous network of the low boiling point metal.

---

All reversible and non-reversible electroplating cells generally contain an electron donor or anode and an electron acceptor or cathode or depolariser. In order that the electro-chemical reaction may proceed, an electrolyte is required as an ion conductor. As can be achieved in some systems, if the electrolyte takes part only intermediately in the transfer of material, that is neither an alteration in composition nor of the concentration is effected by the discharge, the amount of electrolyte can in theory be very small. This possibility provides an important prerequisite for savings in cell volumes.

The electrolyte effects transfer of material, which occurs in reversible cells (accumulators) and non-reversible cells (primary cells) mostly from the cathode to the anode. The anode therefore undergoes a significant increase in volume by becoming covered with the largely non-conducting reaction products. This has two disadvantages: the electrolyte is displaced from the surface of the anode and the formation of the surface coating of the reaction product increases the transfer resistance. In reversible cells or accumulators, both electrodes can suffer from this defect.

The most effective generally known measures for avoiding these disadvantages involve increasing the inner surface of the amount of the sub-divided electrode material necessary for the reaction by making the electrode porous. In an advantageous form of porous electrode, the pore volume should be so large that the increase in volume of the electrode, due to the reaction products formed, can be overlooked, provided that the volume of the electrode does not increase overall and that sufficient pore volume is present unfilled at the end of the discharge that sufficient electrolyte can be taken up to ensure adequate conductivity.

Solutions so far proposed are unsatisfactory in two respects: practically useful porous metal electrodes, e.g. manufactured by pressing together granules of amalgamised zinc, have too small an inner surface. Electrodes having a sufficient inner surface area which are manufactured e.g. from compressed fibrous material, on use of the electrode material, that is during discharge of the plating cell, have the disadvantageous property of causing parts of the electrode to lose electrical conducting connection with the remaining part and thereby the generation of current to be reduced.

The object of the present invention is to provide a porous metal electrode having a large internal surface area, a porous volume accurately suited to the user's requirements and having a structure such that, in use of the electrode, no particles are produced which reduce the electrical conductivity. Accordingly the invention relates to a new improved process for manufacturing porous metal electrodes for plating cells.

According to the invention, a process of manufacturing a porous metallic electrode is provided, which comprises alloying an electrode-forming metal with a second metal having a lower boiling point or sublimation point than the electrode-forming metal, the proportion of the second metal corresponding to the pore volume to be provided in the electrode, producing a homogeneous melt from the alloy, moulding the melt into the shape of the desired electrode and removing the second metal from the moulded electrode by vaporisation or sublimation.

The molten alloy can be made into the form of the electrode (anode) by casting in or injection into a mould. By cooling in the appropriate way it is possible for the phase first forming on setting, having the higher melting point than the other, to separate so that an open grain structure results which later constitutes the matrix structure of the porous electrode. This can be achieved when quick and partial cooling is effected, by cooling one side of the mold, the crystals preferably being formed in radial directions away from the cooled surface. The later setting phases containing less electrode metal mainly crystallise out from the first phase matrix.

The hardened cast body is preferably heated in a high vacuum so that the lower boiling second metal begins to evaporate. The temperature is controlled so that none of the solidified phase melts and is continued so that the alloyed second metal is fully evaporated or sublimed.

With the converse order of separation of the phases, a fine-pored, spongy, but solid, metallic structure is formed, in which the density increases in the direction of the original cooled surface of the alloy.

By varying the proportions of the metals in the mixture and the related velocity of cooling of the molten mixture, the pore volume and porosity can be varied over comparatively wide limits. The maximum obtainable pore volume depends upon the proportion of the second metal and is achieved when this is about 90%. Those pores which actually form the inner surface area of the electrode comprise at least 70% of the total pore volume and have a size ranging from 50 to 100μ.

Further features of the invention are given in the following description and the accompanying drawings.

It will be seen by reference to the accompanying drawings, given by way of example, how a porous electrode is manufactured and how the resulting electrode can be obtained.

FIG. 1 is an elevational view partly in section of an apparatus for simultaneously casting a plurality of electrodes;

FIG. 2 shows a part of the casting mould shown in FIG. 1 on an enlarged scale and as a section taken along line II—II of FIG. 3;

FIG. 3 is a plan view of part of the casting mould shown in FIG. 2;

FIG. 4 shows a cooling device for the casting apparatus in side elevation; and

Figure 5:
FIG. 5 is an enlarged view of a section taken through the finished porous electrode showing the porous structure.

Pure zinc in rod form and 60% by volume of double-distilled mercury were put in a glass vessel, e.g. a "Pyrex"

(R.T.M.) glass tube, which was then evacuated to less than $10^{-2}$ mm. Hg and closed by melting. Then, it was heated in an oven for 8 hours at 250° C. At intervals of 2 hours the alloy was agitated to speed up the mixing. Afterwards a homogeneous amalgam melt was obtained, the alloy was allowed to solidify at room temperature.

As the alloy cooled, the evacuated vessel was cut open and the oxidisable alloy was protected by the introduction of nitrogen against the ingress of atmospheric oxygen. With a further and slower introduction of nitrogen, the alloy was quickly melted again in a heating bath. Now the alloy can be cast as a fine-grained body as is necessary for the further processing. On a horizontal water-cooled metal plate, e.g. of copper, a layer of polytetrafluoroethylene about 0.1 mm. thick was laid and the alloy was cast on to this as a layer about 4 to 5 mm. thick. The alloy can thus be obtained in a finely crystalline, easily divisible form.

The casting of the electrode is effected in the absence of air. The casting operation can be effected in an apparatus shown in FIGS. 1–4 which permits the required cooling to occur.

An electric heating plate 3 equipped with a variable resistance 1 and a remote-indicating thermometer 2 is supported by a frame 4. This comprises two vertical rods and a plate 5 fixed to the frame by adjusting screws 6. A glass jacket 7 is cemented in a groove in the plate 5 and is made airtight with asbestos. The plate 5 carries a ram 8 which can be adjusted to and fixed at any height by a setting screw 9. The ram 8 has a reduced portion 10 for decreasing conduction of heat, to which a pressure plate 11 is fastened. Underneath this is a casting mould 12, the construction of which is shown more clearly in FIGS. 2 and 3. The casting mould 12 which can be formed of, for example, hard copper, has recesses for the simultaneous formation of a plurality of disc-shaped electrodes. In order that the moulded alloy shall not contact the mould, this is coated with a thin layer of a temperature-resistant varnish, e.g. a thermosetting silicone. The underside of the pressure plate 11 is similarly treated. The bottom of the mould 12 should be perfectly planar.

A delivery pipe 15 for the supply of pure nitrogen is fixed in a hole in the plate 5. This pipe 15 extends nearly to the bottom of the glass jacket 7. An outlet pipe 16 is likewise fixed in a further hole in the plate 5.

The actual casting process is as follows: The glass jacket 7 was moved upwardly by raising the plate 5 whereby the ram 8 and the pressure plate 11 were also moved upwardly. An appropriate amount of the previously described solid metal alloy (amalgam), as far as possible in one piece, was placed in the casting mould 12 and the plate 5 was lowered so that the glass jacket 7 was seated tightly. The pressure plate 11 was located about 2 cm. above the amalgam. Nitrogen was introduced through the pipe 15, which expelled air from the space enclosed by the jacket 7 through the outlet pipe 16. The mould 12 was then heated by the heating plate 3. Prior to melting of the amalgam, the screw 9 was released and the ram 8 with the pressure plate 11 was lowered onto the amalgam. The ram 8 was lowered in accordance with melting of the amalgam, and the molten amalgam was slowly pressed by the pressure plate into the mould 12.

When the amalgam has been completely melted, the frame 4 and its associated components are released from the heating plate 3 and seated on a cooling plate 17. This has a planar upper surface and is made from, for example, copper. Underneath the cooling plate 17 are located outlet and inlet pipes 18 for the supply of cooling water.

Immediately after placing the assembly on the cooling plate 17, the ram 8 was pushed down by hand with the screws 9 loosened. After about 30 seconds the moulding had solidified and could be released from the mould 12 by light tapping. Burrs on the moulding were removed as necessary.

The mould body was supported on a suitable base plate, e.g. of brass, in an evacuated vessel, e.g. a glass jacket, which could be heated from the outside. The vessel was evacuated to at least $10^{-3}$ mm. Hg and heated at 95° C. At this temperature the mercury began to vaporise. After 2 hours the temperature was raised at 100° C. for a period of one hour, and then the vessel was heated for further periods of one hour each at 120° and 150° C. Finally the temperature was elevated at 180° C. for a further 2 hour period after which any visible vaporisation of the mercury ceased. The mercury content remaining in the zinc amounted to less than 1% by weight.

Occasional blooming formed on the surface can be removed by scraping with a sharp edge, e.g. glass.

The external dimensions of the thus-treated moulded body had been scarcely affected and it had a pore volume of 60%. Other amalgams can be used correspondingly. The microscopic structure of FIG. 5 shows that the porous electrodes obtained in the manner described have a solid coherent metal framework and a correspondingly high mechanical strength. In FIG. 5 the pores are represented as the clear patches and the metal as the dark portions.

In place of the mercury other low boiling metals can be used, e.g. cadmium, magnesium or zinc, though the melting or sublimation point of the electrode producing material will be correspondingly higher.

The porous electrodes manufactured in the way described have been examined as to their effectiveness as anode materials in a non-reversible cell. A primary cell was made of the zinc-potassium hydroxide—mercury oxide type. The inner construction was in the known form of a flat cell of 0.7 cm.$^3$ overall volume. The capacity attained conforms to the expected improvement; in contrast to the best battery constructions available now, an increase in the capacity, measured in joules per unit volume, of about 100% was obtained.

The porous metal electrodes of the invention above described are not only intended for electrical storage batteries, such as accumulators and primary cells, but can also be used with equal advantage in other galvanic cells with an electrolyte, e.g. electrolytic cells and fuel cells for direct transformation of chemical energy into electrical energy.

The process of manufacturing porous metallic electrodes according to the invention is consequently not limited to the production of electrodes for accumulators or primary cells.

What I claim is:

1. A process of manufacturing a porous metallic electrode, which comprises alloying an electrode-forming metal with an alloying metal having a lower evaporation point than the electrode-forming metal, the proportion of the alloying metal corresponding to the pore volume to be provided in the electrode, producing a homogeneous melt from the alloy, casting the melt into the mould of the desired shape, cooling the melt in the mould, by cooling one side of the mold at a rate sufficient to cause segregation of the components of the alloy into a first continuous network of the electrode-forming metal and a second continuous network of the alloying metal, and removing the alloying metal from the cast electrode by evaporation.

2. A process according to claim 1, in which the evaporation is effected under vacuum.

3. A process as claimed in claim 2, in which the vacuum is at least $10^{-3}$ mm. Hg.

4. A process according to claims 1 and 2, in which during the evaporation the temperature of the moulded electrode is gradually elevated.

5. A process according to claim 1, in which the alloying metal is mercury which is formed into an amalgam with the electrode-forming metal.

6. A process according to claim 5, in which the electrode-forming metal is zinc.

7. A process according to claim 6, in which the evaporation is effected at temperatures gradually elevated from 95° to 180° C.

8. A process according to claim 7, in which the moulded electrode is heated for periods of at least one hour each at temperatures of 95° C., 100° C., 120° C., 150° C. and 180° C.

9. A process according to claim 1, in which the alloying metal is selected from the group consisting of cadmium, magnesium and zinc.

10. A process according to claim 1 in which the alloying metal is sublimable, and is removed from the cast electrode by sublimation.

11. A process according to claim 1, in which the alloying metal is vaporizable and is removed from the cast electrode by vaporization.

References Cited

UNITED STATES PATENTS

| 2,661,238 | 12/1953 | Osti et al. | 29—528 |
| 2,895,819 | 7/1959 | Fiedler | 75—20 |
| 3,125,788 | 3/1964 | Pelzel | 29—528 |
| 3,177,574 | 4/1965 | Kuchek | 29—423 |
| 3,264,101 | 8/1966 | Takeya et al. | 75—222 |

FOREIGN PATENTS

| 127,410 | 5/1948 | U.S.S.R. |
| 1,164,674 | 3/1964 | Germany. |

JOHN F. CAMPBELL, *Primary Examiner.*

P. M. COHEN, *Assistant Examiner.*